United States Patent [19]

Ramachandran

[11] 4,183,814

[45] Jan. 15, 1980

[54] ASBESTOS COMPOSITION HAVING ORGANO-SILANE COATING

[75] Inventor: Sundaresan Ramachandran, North Tonawanda, N.Y.

[73] Assignee: Union Carbide Corporation, New York, N.Y.

[21] Appl. No.: 866,525

[22] Filed: Jan. 3, 1978

[51] Int. Cl.$^2$ .................. C07F 7/10; C09K 7/00
[52] U.S. Cl. .................. 252/8.5 C; 260/448.2 E; 260/448.2 N
[58] Field of Search ........ 260/448.2 N; 260/448.2 E; 252/8.5 C

[56] References Cited

U.S. PATENT DOCUMENTS 3,471,438   10/1969   Chwastiak ........................ 260/40
3,979,276   9/1976    Strain ...................... 260/448.2 N UX

FOREIGN PATENT DOCUMENTS 2540061   10/1975   Fed. Rep. of Germany.

OTHER PUBLICATIONS

"J. Appl. Chem.", 20, pp. 76–79, Mar. 1970.

Primary Examiner—Paul F. Shaver
Attorney, Agent, or Firm—J. Hart Evans

[57] ABSTRACT

A chrysotile asbestos base material having a precipitation deposited siliceous layer and an organo-silane coating bonded to and overlying said siliceous layer.

6 Claims, No Drawings

ASBESTOS COMPOSITION HAVING ORGANO-SILANE COATING

This invention relates to an asbestos base composition. More particularly, this invention relates to a chrysolite asbestos base material which can be used to enhance the rheological properties of fluids such as oil drilling muds and also in reinforcing polyolefins, thickening polyester resins, vinyls and rubbers.

Chrysotile asbestos, as it naturally occurs, may be generally defined as a hydrous magnesium hydroxide. In contact with polar liquids, asbestos exhibits a strong positive charge and thereby attracts anions and thus can be used in removal of detergents from liquids; asbestos, in the natural state, is also highly effective as a flocculating agent for minerals such as titanium dioxide and clays. It has been proposed in German Patent Publication No. 2,546,061 to provide asbestos, and other minerals, with an organo-silane coating by first acid leaching the mineral to remove the outer octahedral layer, under controlled conditions, and thereafter react the leached mineral with an organo-silane. The organo-silane coated material is described as being desirable as an additive in oil well drilling muds and as a gelling agent and reinforcing agent in resins. However, the controlled acid leaching technique described in the German Patent Publication must be carefully practiced in order to avoid excessive removal of asbestos material and present industrial needs require further improvement in the rheological properties of fluids such as oil base drilling muds.

Accordingly, it is an object of the present invention to provide an asbestos base material for enhancing the rheological properties of fluids.

Other objects will be apparent from the following description and claims.

An asbestos base material in accordance with the present invention comprises opened chrysotile asbestos having a precipitation deposited siliceous layer and an organo-silane coating bonded to and over-lying the siliceous layer.

The asbestos base material of the present invention is produced by providing in an aqueous media, opened chrysotile asbestos having a precipitation deposited siliceous outer layer and providing in the aqueous media an organo-silane to provide an organo-silane coating chemically bonded on the siliceous layer.

In the practice of the present invention, the siliceous layer on the chrysotile asbestos can be provided by the method of U.S. Pat. No. 3,471,438—Chwastiak, the disclosure of which is incorporated herein by reference. In a particular embodiment of the method of this patent, opened [1] particulate chrysotile asbestos is provided, such as that available commercially as High Purity Grade Asbestos from Union Carbide Corporation. This asbestos is slurried with water, the slurry conveniently containing from about 0.5% to 4% by weight asbestos and more suitably about 1–2% asbestos by weight. A predetermined amount of concentrated sodium silicate solution, suitably an amount which provides about 12 parts by weight of $SiO_2$ per 100 parts of asbestos, is added to the slurry followed by neutralization to provide in the slurry a pH of about 9.5 or less. Acetic acid is preferably used as the neutralizing agent. Under these circumstances, i.e., a pH of about 9.5 or less, a siliceous gel is precipitated and this gel adheres to and coats the slurried asbestos and provides a siliceous layer thereon.

[1] Opened particulate asbestos refers to particulate asbestos in which the naturally occurring fiber bundles have been separated into their ultimate individual fibers to the extent that most of the constituent particles are in the form of individual fibrils.

Following the precipitation coating of the asbestos as above described, the slurry is adjusted to the extent necessary to provide a pH in the range of about 6 to 9.0, preferably 7 to 8, and an organo-silane is added to the slurry in an amount of about 0.5 to 10 percent by weight of the asbestos base material in the slurry. The thus treated solids are recovered and dried by conventional techniques. The resulting asbestos material has a coating of organo-silane over-lying the siliceous layer of the asbestos base material.

The properties of the organo-silane coated material of the present invention are influenced by the particular organo-silane employed. For example, octyl thiethoxy silane provides an oleophilic coating which has a positive interaction with oil base fluids, such as drilling muds, and improves the rheological properties of these fluids as hereafter described. The organo-silanes used in the practice of the present invention are substantially as described in the abovenoted German Patent Publication and are characterized by one of the two following structures:

Structure I

where G is a hydroxyl group or a group hydroxyzable to hydroxyl such as, for example, alkoxy or halogen; Y is an alkyl group containing from 1 to 20 carbon atoms, a phenyl group, an alkyl substituted phenyl group where the alkyl groups can contain a total of from 1 to 12 carbon atoms or a polyoxyalkylene radical having up to 25 carbon atoms bonded to the silicon atom by a silicon to carbon bond, R and R' are selected from the group described by G and Y or hydrogen; or:

Structure II

where G is a hydroxyl group or a group hydroxyzable to a hydroxyl such as, for example, alkoxyl or halogen: Z is an alkyl group containing from 1 to 20 carbon atoms bearing a functional group such as, for example, amino, oxirane, mercapto or acryloxy; R and R' are selected from the groups described by G and Z, hydrogen, an alkyl group containing from 1 to 20 carbon atoms, phenyl, or alkyl substituted phenyl where the alkyl groups can contain a total of from 1 to 12 carbon atoms.

The following examples will further illustrate the present invention.

EXAMPLE I

Short fiber chrysotile asbestos from the Coalinga, Calif. deposit, obtained from Union Carbide Corporation under the designation High Purity Grade and having the properties shown in Table A was added to water, at 31° C. in an amount of about 1.4% by weight.

TABLE A

| Specific surface area | m.²/gm | 60–80 |
|---|---|---|
| Magnetite content | percent | 0.04–0.5 |
| Reflectance | do | 72–78 |

Specific surface area is calculated from adsorption data using the BET (Brunauer, Emmet, Teller) method as described in Brunauer, "The Adsorption of Gases and Vapors," Princeton University Press (1945).

Magnetite content is measured by permeametric device patterned after ASTM standard method D-1118-57. However, because the lower limit of detection of the ASTM device is only about 0.20% magnetite, the ASTM method has been improved with respect to sensitivity to measure a limit of detection of 0.005% magnetite, and the range extended to measure 0.10% magnetite in the mid-scale of the instrument. In order to obtain this greater range and improved sensitivity, the ASTM method has been modified to detect the phase changes of the current generated when magnetic materials are placed in a transformer core rather than the voltage changes generated.

Reflectance is measured on a sample prepared according to TAPPI (Technical Association of the Pulp and Paper Industry) standard T-452-m-58 and reported as percent of ultimate reflectance based on magnesium oxide as 100% reflectance.

The water-asbestos mixture (35 grams of asbestos in 2.5 liters of water) was introduced into a large Waring Blendor[2] and the blendor was run at its highest speed for about 3 minutes. Following this treatment, sodium silicate (1 M solution) in the amount of 70 milliliters was gradually added to the asbestoswater slurry while slowly stirring the slurry with a mechanical stirrer. This provided in the slurry the equivalent of about 4.2 grams of $SiO_2$. This mixture was then treated by slowly adding acetic acid (1 M) to neutralize the solution and obtain a pH of about 9.5. At this pH, precipitation of siliceous material occurred which was substantially all adsorbed by the slurried asbestos particles and such particles when added to water exhibit a negative charge as can be demonstrated by standard electrophoresis techniques. On the other hand, untreated asbestos exhibits a strong positive charge under the same circumstances.
[2]Model No. CB5

After this step, additional acetic acid (1 M) was added to bring the pH to about 7.6 and the slurry was slowly stirred by a mechanical mixer for about 3 minutes. The total amount of acetic acid used was about 40 milliliters. 2.1 grams of octyl triethoxy silane was added to the slurry which was mixed further for about 5 minutes. The solids were removed by filtration and dried at about 110° C. for about 3 hours. The resulting product had an oleophilic organo-silane coating overlying and chemically bonded to the siliceous layer on the opened chrysotile asbestos.

A particular embodiment of the present invention is the use of the material of the present invention as an additive to conventional and well known drilling fluids used as drilling muds in oil and gas well drilling operations. In connection with this embodiment material prepared as in Example I was opened in a Waring blender (Model 91-264) at high speed for about 30 seconds. It was then employed, in the proportions shown in Table I, as an additive in a standard oil base fluid (drilling mud) having the following composition:

332.5 ml of No. 2 Diesel Oil
17.5 ml of Water

The actual amounts of the additions were 2, 4 and 7 gm.

The testing procedure for viscosity evaluation of the drilling mud was as follows:

The oil and water were mixed at high speed in a Waring blender (Model No. 91-264) for 2 minutes prior to the addition of the prepared asbestos base material of Example I. Following the addition, stirring was continued in the blender, also at high speed, for 10 minutes, after which time, the sample was removed to a Fann Viscometer (Model No. 35A), cooled to 115° F. (46° C.) and the viscosity and gel strengths determined using standard procedures.* The results are shown in Table I.
*As described in American Petroleum Institute Publication No. API RP 13B, fourth edition, November 1972.

TABLE I

Effect of Asbestos Base Material of this Invention on Mud Properties

| | | Fann Viscosity Results | | | |
|---|---|---|---|---|---|
| No. | Additive Loading (lb/bbl) | A.V. (in cps) | P.V. (in cps) | Y.P. (in #/100ft²) | Gel Strength (in #/100 ft² Initial |
| 1 | 2 | 8 | 4 | 8 | 3 |
| 2 | 4 | 17.5 | 6 | 23 | 9 |
| 3 | 7 | 70.0 | 16 | 108 | 39 |

EXAMPLE II

Fifty grams of high purity asbestos (the same starting material used in Example I) were acid leached prior to silane treatment following the procedure outlined in the above cited German Patent Publication No. 2,546,061 as follows: Fifty grams of the high purity asbestos was slurried in 600 ml of water and 18 gm of 98% sulfuric acid were added and the slurry was stirred using a mechanical stirrer for 3 hours. Subsequently, 10.8 gm. of a 50% sodium hydroxide solution was added to the slurry to increase the pH to 6.5. This was followed by adding to the slurry 3 grams of octyl triethoxy silane mixed in 20 ml of methanol and mixing was continued for 16 hours. After this step, the slurry was filtered and the solids were dried at 110° C. for 3 hours. The product was then opened in a Waring blender (Model No. 91-264) for 30 seconds at high speed.

The above acid leached, silane treated sample was used as an additive and tested in a standard drilling mud composition as described in connection with the material of Example I. The results are given in Table II.

TABLE II

Effect of Acid Leached, Silane Treated Asbestos on Oil Mud Properties

| | | Fann Viscosity Results | | | |
|---|---|---|---|---|---|
| No. | Additive Loading (lb/bbl) | A.V (in cps) | P.V. (in cps) | Y.P. (in #/100 ft²) | Gel Strength (in #/100 ft² Initial |
| 1 | 7 | 28.5 | 10.0 | 37 | 21 |
| 2 | 14 | 80.0 | 18.0 | 124 | 64 |

A comparison of the results of Table I and Table II reveals that the material of this invention (Table I of Example I) has superior thickening properties as compared to the material of Example II. For example, as can be seen by comparing the results shown in Tables I and II an apparent viscosity of 70 cps is achieved through the practice of the present invention using additive in proportions of about 7 lbs. per bbl while almost twice as much additive of Example II material was required to achieve similar results. Further, the gel strength provided by the present invention for an addition of 7 lbs per bbl provides about double the gel strength achieved with the material of Example II. The improved properties enable superior performance of oil base drilling needs. The material of the present invention can be added to the oil base fluid in an amount of about 0.10 to 7% by weight, with the preferred amount being from about 0.5 to 2%. As previously mentioned, the asbestos base material of the present invention can be used as an addition to polyolefins, polyester resins, vinyls, rubbers and the like.

Drilling fluids to which material of the present invention can be added are oil base fluids, usually diesel oil, and water base fluids such as described in "Fluid Control" 12th Ed. Subcommittee of API published by Petroleum Extension Service, University of Texas at Austin (1969) and 37 Composition and Properties of Oil Well Drilling Fluids" W. F. Rogers, 3rd Ed (1963)—Gulf Publishing Co., Houston, Texas. For water base fluids a hydrophillic organo-silane coating is provided on the additive material, e.g., using a polyoxyalkylene substituted hydrolyzable silane such as

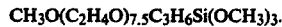

$$CH_3O(C_2H_4O)_{7.5}C_3H_6Si(OCH_3)_3.$$

In the practice of the present invention, the siliceous layer on the opened chrysotile asbestos is less than 25% by weight of the asbestos and preferably about 10 to 15% by weight and the organosilane coating is preferably about 5 to 7% by weight of the asbestos.

What is claimed is:

1. An asbestos base material comprising opened chrysotile asbestos having a precipitation deposited siliceous layer and an organo-silane coating bonded to and over-lying said siliceous layer.

2. A drilling fluid for use in oil and gas drilling operations containing from about 0.10 to 7% by weight of the material of claim 1.

3. A method for producing organo-silane coated asbestos base material which comprises:
   (i) providing opened chrysotile asbestos material having a precipitation deposited siliceous outer layer in an aqueous media at a pH of about 6 to 9
   (ii) contacting said material with organo-silane to provide an organo-silane coating on said siliceous layer
   (iii) recovering the organo-silane coated asbestos base material from the slurry.

4. A method for coating chrysotile asbestos with an organo-silane which comprises:
   (i) providing an aqueous slurry of opened chrysotile asbestos
   (ii) providing in mixture with the slurry a solution of a material capable of preciptitating a silica gel
   (iii) treating the mixture of slurry and solution with a neutralizing agent to obtain a pH of about 9.5 or less in the slurry-solution mixture to thereby cause precipitation of siliceous material onto the asbestos in the slurry and provide a siliceous layer thereon
   (iv) further treating the slurry with a neutralizing agent to the extent necessary to provide a pH in the range of about 6 to 9.
   (v) adding organo-silane to the slurry of step (iv) to thereby provide an organo-silane coating on said siliceous layer
   (vi) recovering organo-silane coated chrysotile asbestos from the slurry.

5. A material in accordance with claim 1 wherein the organo-silane is octyl triethoxy silane.

6. A method in accordance with claim 3 wherein the organo-silane is octyl triethoxy silane.

* * * * *